Aug. 16, 1938.　　　　　G. F. STOTT　　　　　2,127,240
CHLORIDIZING-CYANIDE PROCESS FOR EXTRACTING VALUES FROM ORES
Filed Aug. 31, 1935
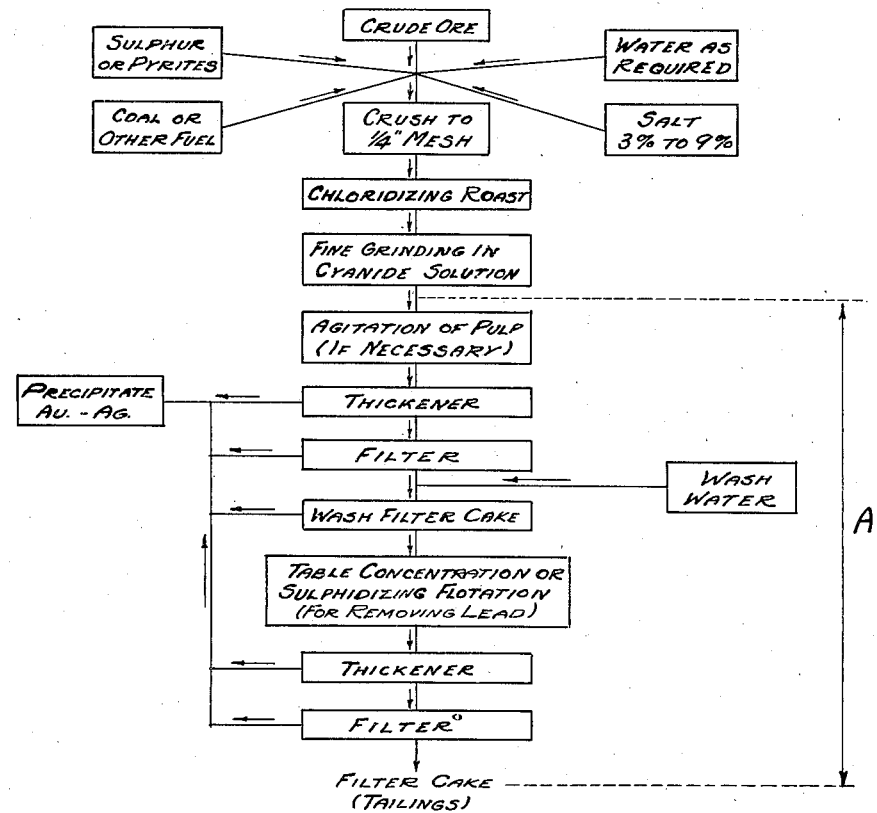
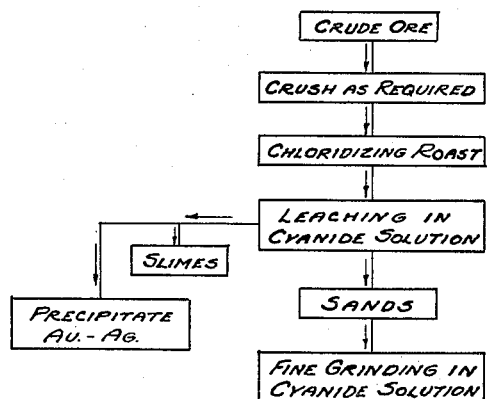
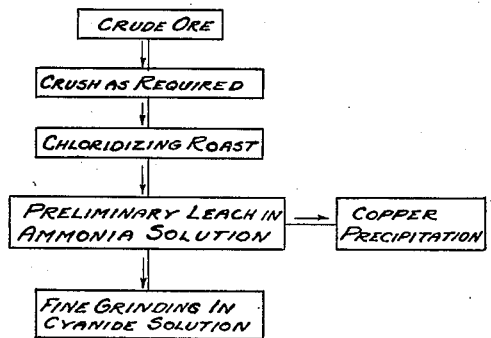
INVENTOR
G. F. STOTT,
BY
ATTORNEY Patented Aug. 16, 1938

2,127,240

UNITED STATES PATENT OFFICE 2,127,240

CHLORIDIZING-CYANIDE PROCESS FOR EXTRACTING VALUES FROM ORES

George F. Stott, Eureka, Nev., assignor to Eureka Prospect, Eureka, Nev., a partnership composed of J. A. Hogle, S. P. Holt, and G. F. Stott Application August 31, 1935, Serial No. 38,693

12 Claims. (Cl. 75—105)

This invention relates to a chloridizing-cyanide metallurgical process, and its principal object is to extract the values to a maximum degree, from rebellious or refractory ores, efficiently, conveniently and economically.

Ores known as "rebellious" or "refractory" are usually complex in structure, and contain metals such as copper, gold, silver, lead in various combinations with other elements, such as sulphur, tellurium, arsenic, antimony, bismuth, iron, manganese, and so on, ores of this character being either difficult or impossible to treat by usual methods. When such ores are subjected to a chloridizing roast, followed by cyanidation, I have found that they will yield a high percentage of their valuable contents, and these may be separated quickly and easily into marketable products.

In the drawing,

Fig. 1 represents a flow diagram setting forth the usual sequence of steps in which this process is practiced; and Figs. 2 and 3, fragmentary flow diagrams, illustrating various differences in the steps followed.

In the practice of my novel process, the ore is preferably crushed to one-quarter inch mesh or to any other suitable degree of fineness and mixed with common salt (NaCl), sulphur and coal, together with sufficient water to produce a relatively damp mixture. These same substances may be mixed with the ore before crushing, and the entire mixture crushed together.

The percentages of the ingredients, by weight, relative to the weight of the ore, are approximately as follows: salt, nine per cent; sulphur, one-half of one per cent; and coal, three per cent. The amount of salt in every case should be sufficient to effect the conversion of the metal-bearing minerals into the respective chlorides; and the amount of coal, sufficient to make the mixture readily ignitable in carrying on the roasting of the furnace-charge by means of forced draft. Instead of sulphur, a natural sulphide such as pyrites or arseno-pyrites, in quantities to yield the proper amount of sulphur, may be used.

It is to be particularly noted that the presence of moisture during the roasting stage of my process, plays a necessary and fundamental part in the rapid and complete transformation of the various metal-bearing minerals into their corresponding chlorides.

The roasting for this reason, is more advantageously conducted in what is known as the "shaft" type of chloridizing roasting furnace, than in other types of furnaces. The moisture and generated chlorine gases which pass through the charge of ore in advance of the fire zone in the shaft-type furnace, are far more effective in chloridizing, than are the dry gases generated in the kiln or wedge type furnaces.

The chloridizing roast as used in my improved process, is similar to that practiced late in the 19th century in connection with the well known chlorination process, the latter however, being modified by what is known as the Holt-Dern process. After the chloridizing roast, I depart from prior practice in the chlorination process, and introduce a novel procedure.

In the case of ores where a low percentage of copper occurs in the presence of an iron oxide, the copper reacts with the iron oxide to form insoluble compounds which are not acted upon by a cyanide solution. This results in a low consumption of cyanide chemicals.

In cases where the percentage of copper present in the ore is relatively higher, the advantage of its reaction with the iron oxide is diminished in inverse proportion to the amount of copper present. The objectionable copper content may be removed by subjecting the roasted calcines to an ammoniacal or acid leach, from the solution of which the copper may be recovered by usual precipitation methods.

If the leaching step or removal of excess copper is not necessary, the chloridized calcines from the roaster are ground to a suitable degree of fineness in a cyanide solution, in order to extract any silver and/or gold contents. The degree of fineness to which the chloridized calcines are ground, as well as the strength of the cyanide solution, varies with different ores and with the proportion of precious metals contained therein.

Some ores, after being subjected to the chloridizing roast, may be leached directly with fairly satisfactory results, but in no case is the recovery as complete as it is when fine grinding of the roasted calcines is resorted to, as heretofore outlined.

The pulp resulting from the mixture of the finely ground calcines and the cyanide solution, is handled as in ordinary cyanide practice, but with a difference in results favorable to the preparatory chloridizing roasts, which speed up the settling rates of many ores whose settling otherwise, can be accomplished only with difficulty. At the same time, the rate of dissolving of the precious metal contents of an ore by the cyanide solutions is speeded up considerably, due to the chloridizing roast, thus reducing the time element occupied in the dissolution stage.

The reduction in the time required for dissolution, lessens and simplifies the extensive plant equipment consisting of tanks, thickeners and agitators necessary in the usual practice of the cyanide process.

The pregnant cyanide solution may be run through zinc boxes, the Merrill-Crow process may be applied, or other usual precipitation methods, such as zinc dust, aluminum dust, powdered magnesium, sodium sulphide or electrolytic, may be resorted to, in order to obtain the gold and silver precipitates which when melted, yield gold-silver bullion.

In the event that ores to be treated by the present process contain lead-bearing minerals as well as silver and/or gold, the gold and silver may be extracted as hereinbefore specified, while the residual sands afterwards, may be concentrated for their lead content. Any lead in solution, may be precipitated by well known means, and the lead recovered as usual.

If desired, the lead may be removed from the ore before applying the cyanide solution, but in such a case, it contains silver and/or gold in proportion to the amount of lead originally contained in the lead-bearing mineral.

The present process solves the problem of recovering fine mineral particles disseminated in certain ores, which, owing largely to their sliming characteristics, cannot be successfully milled or treated in any other way. The recovery of such finely disseminated mineral particles is brought about by the chloridizing roast, which completely changes the sliming characteristics possessed by those certain ores.

In the present process, the chloridizing roast automatically provides the additional free alkali generally necessary to prevent wasteful decomposition of cyanide chemicals. Therefore, it is unnecessary to add caustic lime or caustic soda for protective alkalinity in the cyanide circuit as is done in the practice of the usual cyanide process.

The source of this alkalinity in the roasted calcines is found in the decomposition of part of the salt, and of the lime and magnesium carbonates and the gangue minerals of most ores. Sodium, calcium and magnesium are converted into their oxides by the calcining step, and yield corresponding hydroxides or other alkali compounds when dissolved in water.

Where ores have their origin within igneous rocks, there may be an insufficiency of lime or magnesium to provide alkalinity. In such instances, raw limestone may be added to the roaster charge to make up the deficiency. Otherwise, caustic lime can be added to the calcines as is done in the usual cyanide circuits.

The pulps which result from wetting the roasted calcines with water and cyanide chemicals, are soon transformed into saturated brine-cyanide solutions and produce no deleterious effect upon the cyanide chemicals. In fact, such solutions become more active solvents of gold and silver values, and these values are more completely precipitated from such solutions than is the case where water-cyanide solutions are used in the treatment. The brine solution, being of greater specific gravity than unburned coal, coke or other carbon fuel in the roasted calcines, makes it possible to float off these unburned carbons, thus rendering their removal comparatively easy, and preventing premature precipitation of the metals in the cyanide circuit.

The desirability of removing copper from an ore, before cyanidation, has hereinbefore been mentioned, but it may now be stressed that in order to avoid a wasteful consumption of cyanide chemicals, it is first of all necessary to ascertain whether or not an ore to be processed, contains copper in one form or another, and then to remove the same.

The step procedure of conducting the present process is illustrated in general in the flow sheet, Fig. 1. A somewhat different step procedure is represented in Fig. 2, and still another step procedure in Fig. 3.

According to Fig. 1, the crude ore is mixed with sulphur or a substance which yields sulphur, as well as with coal or other fuel, water as required, and the proper amount of salt, the latter usually from three per cent to nine per cent. These ingredients are crushed to the proper degree, usually to pass one-quarter inch mesh, and formed into a moist mixture. The moist mixture is then given a chloridizing roast, preferably in a shaft furnace, and results in a calcined product which usually is highly alkaline in its chemical reaction. From the chloridizing roaster, the product is taken to a fine grinder containing a solution of cyanide chemicals, and because of the alkalinity of the chloridized product, the dissolution of the precious metals present therein as chlorides, is rapidly accomplished without the addition of lime or other alkalis. The pulp coming from the fine grinder, may or may not be passed through an agitator, and may then be transferred to a thickener, which operates to overflow the solution containing precious metals, from the sands. The solution overflowing from the thickener, is conducted to a precipitation tank, while the sands go to a filter. The filtrate from the filter is conducted to the aforesaid precipitation tank, while the filter cake is thoroughly washed with water, and the wash water is conducted to the precipitation tank. If lead is present in the pulp resulting from the washed filter cake, the lead is removed by conducting the pulp to table concentrators, or exposing it to sulphidizing flotation as the case may require. The de-leaded pulp from the tables or from the sulphidizing units is conducted into a second thickener. If no lead is present in the washed filter cake, the resulting pulp is taken direct to the said second thickener. From the second thickener the liquid is over-flowed and conducted to the precipitation tank, while the sands are taken to a second filter. From this filter, the filtrate is conducted to the precipitation tank while the filter cake is discarded as tailings.

The flow diagram in Fig. 2, takes into consideration a slight modification in the proceeding outlined in the flow diagram of Fig. 1. In this modified flow diagram, the crude ore is crushed as required, and is then taken to a chloridizing roaster where the chloridization takes place in the presence of moisture as hereinbefore described. In this scheme the product from the moist-chloridizing roaster, instead of going directly to the fine grinder, is first given a leach in a tank of cyanide solution where the alkalinity of the roaster product asserts itself in promoting the dissolution of the precious metals. The solution from the leaching tank is drawn off and conducted to a precipitation tank, but during its passage to the tank, any slimes in the solution are removed by any of several well known means.

The sands from the leaching tank are conducted to the fine grinder, from which point the treatment of the pulp follows the same steps hereinbefore described in connection with what is indicated in zone "A" of Fig. 1, it being understood that the precipitation tank in Fig. 2, may be the identical one shown in Fig. 1.

I am aware that the chloridizing of ore containing precious metals, is not new, and I am also aware that the cyaniding of ores containing precious metals, is in itself not new. However, so far as I know, the use of chloridizing and cyaniding steps practiced as hereinbefore specified, is radically new.

It is obvious that any minor variations in my process procedure can be restorted to without departing from the spirit of the following claims.

Having fully described my invention, what I claim is:

1. A process of extracting values from ore, consisting in crushing the ore to a suitable degree of fineness, subjecting the crushed ore to a chloridizing roast in the presence of moisture, the said chloridizing roast being carried to a point where protective alkalinity for subsequent cyaniding is produced automatically, grinding the resulting chloridized alkaline calcines fine in a cyanide solution of proper strength, and extracting the precious metal values from the pregnant cyanide solution.

2. A process for extracting values from ore, consisting in crushing the crude ore to one-quarter inch mesh or thereabouts, mixing the crushed ore with salt, sulphur and coal, moistening the mixture as required, subjecting the moistened mixture to a chloridizing roast, the said chloridizing roast being carried to a point where protective alkalinity for subsequent cyaniding is produced automatically, grinding the roasted alkaline calcines fine in a cyanide solution, and extracting the metallic values contained in the pregnant cyanide solution.

3. A process for extracting values from ore, consisting in mixing the crude ore with salt, coal and sulphur in the proper proportions, moistening the mixture as required, crushing the moistened mixture to the proper degree of fineness, subjecting the crushed product to a chloridizing roast in a shaft furnace, the said chloridizing roast being carried to a point where protective alkalinity for subsequent cyaniding is produced automatically, fine-grinding the roasted alkaline calcines in a cyanide solution of proper strength, and extracting the metallic values from the pregnant cyanide solution.

4. A process for extracting values from ore, consisting in crushing the crude ore to a suitable degree of fineness, subjecting the crushed product to a moist chloridizing roast, fine-grinding the chloridized calcines in a brine cyanide solution, agitating the brine cyanided pulp, thickening the pulp as required, precipitating the precious metals from the thickener liquor, filtering the thickener sands, and extracting any precious metal pregnant cyanide residue contained in said sands.

5. A process for extracting values from ore, consisting in mixing the crude ore with 9 per cent or thereabouts by weight, of common salt, sulphur, one-half of one per cent or thereabouts by weight, fuel as required, and water to produce a substantially moist mixture; crushing the mixture to pass one-quarter inch mesh, subjecting the crushed, moist product to a chloridizing roast, the said chloridizing roast being carried to a point where protective alkalinity for subsequent cyaniding is produced automatically, fine-grinding the chloridized calcines in a cyanide solution of the proper strength, and extracting the metallic values from the pregnant cyanide solution.

6. A process for extracting values from ore, consisting in crushing the ore to a suitable degree of fineness, subjecting the crushed product to a moist chloridizing roast, leaching the chloridized product in a cyanide solution, precipitating the precious metal content of the said cyanide solution, fine-grinding the sands from the cyanide leach in a second cyanide solution, and extracting the precious metal values from the pregnant cyanide solution resulting from said fine grinding.

7. A process for extracting values from ore containing precious metals and copper, consisting in crushing the ore to a suitable degree of fineness, subjecting the ground ore to a chloridizing roast, leaching the chloridized product in ammonia, fine-grinding the sands from the ammonia leach in a cyanide solution, and extracting the metallic values from the pregnant cyanide solution.

8. A chloridizing-cyanide process, including the step which consists in suitably preparing ore containing precious metals, subjecting the prepared ore to a moist chloridizing roast which results in an alkaline product, the said chloridizing roast being carried to a point where protective alkalinity for subsequent cyaniding is produced automatically, grinding the alkaline chloridized product in a cyanide solution, and extracting the precious metals from the pregnant cyanide solution.

9. A process for extracting precious metals from ore, including the step which consists in suitably preparing the ore, chloridizing the prepared ore to a point where protective alkalinity for subsequent cyaniding is produced automatically, leaching the chloridized product in cyanide solution, grinding the sands from the cyanide leach, fine, in a cyanide solution, and extracting the precious metals from the pregnant cyanide solution resulting from said fine-grinding.

10. A process in accordance with claim 9, including the further step which consists in removing slimes from the cyanide leach solution, and precipitating precious-metal content from the de-slimed pregnant cyanide leach solution.

11. A process for extracting precious metals from ore containing copper, including the step which consists in preparing the ore, chloridizing the prepared ore, leaching the chloridized product in ammonia solution to dissolve the copper, grinding the sands from the ammonia leach, fine, in cyanide solution, and extracting the precious-metal content from the cyanide solution.

12. A process in accordance with claim 11, including the further step which consists in removing copper content from the ammonia-leach solution.

GEORGE F. STOTT.